United States Patent [19]
Fujimori et al.

[11] Patent Number: 5,535,026
[45] Date of Patent: Jul. 9, 1996

[54] LIQUID CRYSTAL DISPLAY DEVICE WITH A POLYMER BETWEEN LIQUID CRYSTAL REGIONS MADE BY A HEATING AND COOLING PROCESS

[75] Inventors: Koichi Fujimori, Nabari; Shinji Yamagishi, Osaka; Tokihiko Shinomiya, Nara, all of Japan

[73] Assignee: Sharp Kabushiki Kaisha, Osaka, Japan

[21] Appl. No.: 504,131

[22] Filed: Jul. 19, 1995

[30] Foreign Application Priority Data

Jul. 20, 1994 [JP] Japan .................................. 6-168417

[51] Int. Cl.$^6$ ........................... G02F 1/13; G02F 1/1333
[52] U.S. Cl. ................. 359/51; 359/52; 359/62; 359/81
[58] Field of Search .................... 359/43, 51, 52, 359/62, 81

[56] References Cited

U.S. PATENT DOCUMENTS 5,473,450  12/1995  Yamada et al. .................... 359/62

FOREIGN PATENT DOCUMENTS

| 58-501631 | 9/1983 | Japan . |
| 61-502128 | 9/1986 | Japan . |
| 3-46621   | 2/1991 | Japan . |
| 3-72317   | 3/1991 | Japan . |
| 3-59515   | 3/1991 | Japan . |
| 6-43438   | 2/1994 | Japan .................... 359/62 |
| 83/01016  | 3/1983 | WIPO . |
| 85/04262  | 9/1985 | WIPO . |

Primary Examiner—William L. Sikes
Assistant Examiner—Ron Trice
Attorney, Agent, or Firm—David G. Conlin; Kevin J. Fournier

[57] ABSTRACT

A liquid crystal display device includes a pair of substrates provided with electrodes, at least one of the substrates being transparent, a liquid crystal region and a polymeric wall surrounding the liquid crystal region, the liquid crystal region and the polymeric wall being interposed between the pair of substrates. Such a liquid crystal display device can be obtained by a method including at least one step of heating a liquid crystal cell including a mixture containing a liquid crystal material and a photocurable resin interposed between the pair of substrates to a temperature higher than the transition temperature of the liquid crystal material in order to control a mobility of the liquid crystal material and the photocurable resin; and at least one step of cooling the heated liquid crystal cell to a temperature lower than the transition temperature in order to cause phase separation of the liquid crystal material from the photocurable resin and form a liquid crystal region and a polymeric wall at desired locations.

10 Claims, 6 Drawing Sheets

LIQUID CRYSTAL DISPLAY DEVICE WITH A POLYMER BETWEEN LIQUID CRYSTAL REGIONS MADE BY A HEATING AND COOLING PROCESS

BACKGROUND OF THE INVENTION

1. Field of the Invention

The present invention relates to a liquid crystal display device and a method for producing the same. In particular, the present invention relates to a liquid crystal display device in which a liquid crystal region and a polymeric wall surrounding the liquid crystal region are interposed between a pair of substrates, at least one of which is transparent, provided with electrodes, and a method for producing such a liquid crystal display device.

2. Description of the Related Art

At present, liquid crystal display devices of a variety of display modes are used. As a liquid crystal display device utilizing an electro-optic effect, for example, liquid crystal display devices of a twisted nematic (TN) mode or a super-twisted nematic (STN) mode, which use nematic liquid crystal, have been put into practical use. Moreover, a liquid crystal display device utilizing ferroelectric liquid crystal (FLC) has been recently put into practical use, too.

Alternatively, a liquid crystal display device, which utilizes birefringence of liquid crystal so as to electrically control the display to be a transparent state or an opaque state, has been proposed. In such a liquid crystal display device, the refractive index of the liquid crystal molecules with respect to ordinary light is basically matched with the refractive index of a polymer working as the display medium. More specifically, in the liquid crystal display device, the transparent state is shown when the liquid crystal molecules are uniformly aligned in the direction of the electric field by application of a voltage, and the opaque state is shown under application of no voltage because of light scattering caused by the turbulence of the liquid crystal molecules.

As a method for producing such a liquid crystal display device, the following methods have been proposed: (1) a method for providing a display medium by allowing polymer capsules to contain liquid crystal, as disclosed in Japanese National Publication No. 58-501631; (2) a method for forming a liquid crystal region in a mixture of a liquid crystal material and a polymeric material by mixing the polymeric material such as a photocurable resin (or a thermosetting resin) and the liquid crystal material, and then curing the polymeric material by light (or heat) to cause phase separation of the liquid crystal material from the polymeric material, as disclosed in Japanese National Publication No. 61-502128; (3) a method for controlling the diameter of a liquid crystal region in the form of a droplet, as disclosed in Japanese Laid-Open Publication No. 3-72317; (4) a method for impregnating a porous polymeric film with liquid crystal, as disclosed in Japanese Laid-Open Patent Publication No. 3-59515; and (5) a method for floating polymeric beads working as a source of light scattering in liquid crystal interposed between two transparent electrodes which are isolated from each other, as disclosed in Japanese Laid-Open Patent Publication No. 3-46621. These methods, however, have the following problems, respectively.

(1) In the case of providing a display medium by allowing polymer capsules to contain liquid crystal, liquid crystal molecules contained in each polymer capsule form an independent liquid crystal region. For this reason, driving voltage for aligning the liquid crystal molecules is varied with respect to each liquid crystal region. As a result, a high driving voltage is required in order to simultaneously operate all of the liquid crystal regions, thereby limiting the range of use as a liquid crystal display device.

(2) In the case of forming a liquid crystal region in a mixture of a liquid crystal material and a polymeric material, it is difficult to form the liquid crystal region at a desired position in the mixture precisely;

(3) In the case of controlling the diameter of a liquid crystal region in the form of a droplet, it is difficult to control the diameter of the liquid crystal region precisely.

(4) In the case of impregnating a porous polymeric film with liquid crystal, the phase separation is not used for forming a liquid crystal region. Accordingly, the selection of applicable polymeric materials and liquid crystal materials has a wide range, and porous polymeric films impregnated with liquid crystal can be easily formed. On the other hand, currently, this method has a problem in that it is difficult to precisely control the diameter of the liquid crystal region in the form of a droplet and to precisely form the liquid crystal region in the direction along the substrate surface.

(5) In the case of floating polymeric beads working as a source of light scattering in liquid crystal, it is difficult to uniformly disperse the beads, although the intensity of the light scattering is great. Therefore, it is difficult to generate the same extent of scattering with respect to each pixel, resulting in display irregularity.

As described above, in the polymer dispersed type liquid crystal display device using the polymeric liquid crystal and having liquid crystal regions in the form of a droplet dispersed therein, the shape of the liquid crystal regions is not uniform and it is difficult to precisely control locations of the liquid crystal regions in the direction along the substrate surface, because of a production method thereof. In such a polymeric dispersed type liquid crystal display device, a driving voltage is varied with respect to each liquid crystal region, in addition to the failure of the precise control of the locations of the liquid crystal regions. Accordingly, the liquid crystal display device of such a type does not show steep electro-optic characteristics at a threshold value, and the driving voltage is relatively high. Moreover, such a polymer dispersed type liquid crystal display device has another problem in that contrast is relatively low because there exist a great number of liquid crystal regions of low light scattering ability.

Furthermore, in such a liquid crystal display device, it is not possible to enlarge the screen while maintaining a high definition. In addition, in the case of a duty driving system, in which the liquid crystal display device is driven in accordance with values obtained by averaging signals, it is impossible to make the duty ratio high.

In order to solve the above problems in the polymer dispersed type liquid crystal display device, the inventors of the present invention have discovered a novel display mode. This display mode has the following features: (1) phase separation of a liquid crystal material from a polymeric material is more definite, and a liquid crystal region is formed in a pixel area and a polymeric region is formed in a non-pixel area; and (2) the polymeric region is formed in a shape of a column so as to obtain a polymeric wall surrounding the liquid crystal region, acting as a spacer. Thus, a liquid crystal display device having such a display mode is excellent in an impact resistance. As methods for producing a liquid crystal display device having such a mode, the inventors of the present invention have proposed the following two production methods.

A first production method includes the steps of: (1) injecting a mixture of a liquid crystal material, a photocurable resin as a polymeric material and a photopolymerization initiator between a pair of substrates disposed opposite each other; (2) providing a photomask on one of the substrates so as to prevent light from being radiated to pixel areas; and (3) irradiating the mixture with ultraviolet rays (hereinafter referred to as UV rays) over the photomask. Thus, liquid crystal regions are formed in the pixel areas, which are weakly irradiated, while polymeric regions are formed in the non-pixel areas, which are intensely irradiated. Such a production method of a liquid crystal display device is disclosed in Japanese Laid-Open Patent Publication No. 6-301015. According to this production method, a photomask is used so as to prevent light from being radiated to pixel areas, so that liquid crystal regions can be formed in the pixel areas at desired locations.

A second production method uses a self-alignment method in which an indium tin oxide (ITO) electrode is used as a photomask. This production method uses the ITO electrode as a photomask utilizing the characteristic that an ITO electrode absorbs UV rays. The difference between transmittance of ITO electrode portions and that of non-ITO electrode portions is used to form an intensely irradiated region and a weakly irradiated region, thus obtaining liquid crystal regions in the pixel areas.

In the above production methods, the ultimate objective is to cause complete phase separation to such an extent that the photocurable resin does not remain in the pixel areas, i.e., to obtain a liquid crystal region completely separated from a polymeric region. However, it is extremely difficult to cause the complete phase separation of the liquid crystal material from the photocurable resin. In other words, in the above production methods, there are many cases where the photocurable resin is left in the liquid crystal region, or the liquid crystal material remains in the polymeric region (i.e., the polymeric wall). In the case where the photocurable resin is left in the liquid crystal region, the following problems arise: (1) the aperture ratio of the panel is reduced due to the left photocurable resin; or (2) the alignment state of the liquid crystal molecules is deteriorated by the photocurable resin left on the alignment film, so that, the optical characteristics (e.g., response speed or contrast) of the liquid crystal display device are deteriorated. On the other hand, in the case where the liquid crystal material remains in the polymeric wall, the following problems arise: (1) the optical characteristics of the liquid crystal display device are deteriorated by light scattering caused in the non-pixel areas; or (2) the strength of the polymeric wall is not sufficient, so that the impact resistance of the liquid crystal display device is not sufficient.

As described above, when the phase separation of the liquid crystal material from the photocurable resin is not completely conducted, a variety of problems arise. Therefore, a liquid crystal display device in which the liquid crystal material and the photocurable resin are more distinctly phase-separated is desired.

SUMMARY OF THE INVENTION

A liquid crystal display device according to the present invention including a pair of substrates provided with electrodes, at least one of the substrates being transparent, a liquid crystal region, and a polymeric wall surrounding the liquid crystal region, the liquid crystal region and the polymeric wall being interposed between the pair of substrates, is produced by a process including the steps of: heating a liquid crystal cell including a mixture containing a liquid crystal material and a photocurable resin interposed between the pair of substrates to a temperature higher than a transition temperature of the liquid crystal material in order to control a mobility of the liquid crystal material and the photocurable resin, the step of heating being performed at least once; and cooling the heated liquid crystal cell to a temperature lower than the transition temperature in order to cause phase separation of the liquid crystal material from the photocurable resin and to form a liquid crystal region and a polymeric wall at desired locations, the step of cooling being performed at least once.

In one embodiment of the invention, an amount of a polymer existing in the liquid crystal region is equal to or smaller than 3 weight % with respect to the total amount of liquid crystal and polymer existing in the liquid crystal region.

In another embodiment of the invention, a difference between a transition temperature of liquid crystal existing in the liquid crystal region and a transition temperature of the liquid crystal material is equal to or smaller than ±10° C.

According to another aspect of the invention, a method for producing a liquid crystal display device including a pair of substrates provided with electrodes, at least one of the substrates being transparent, a liquid crystal region and a polymeric wall surrounding the liquid crystal region, the liquid crystal region, and the polymeric wall being interposed between the pair of substrates, includes the steps of: heating a liquid crystal cell including a mixture containing a liquid crystal material and a photocurable resin interposed between the pair of substrates to a temperature higher than a transition temperature of the liquid crystal material in order to control a mobility of the liquid crystal material and the photocurable resin, the step of heating being performed at least once; and cooling the heated liquid crystal cell to a temperature lower than the transition temperature in order to cause phase separation of the liquid crystal material from the photocurable resin and to form a liquid crystal region and a polymeric wall at desired locations, the step of cooling being performed at least once.

In one embodiment of the invention, the above-described method further includes the step of irradiating the liquid crystal cell with UV rays at least once at a temperature higher than the transition temperature.

In another embodiment of the invention, the UV ray radiation is performed by using a self-alignment method.

In still another embodiment of the invention, the UV ray radiation is performed through a photomask.

In a further embodiment of the invention, the temperature lower than the transition temperature is equal to or lower than room temperature.

In still a further embodiment of the invention, the temperature lower than the transition temperature is equal to or lower than 0° C.

In another embodiment of the invention, a cooling rate in the cooling step is in a range from 3° C./h to 20° C./h.

Thus, the invention described herein makes possible the advantages of (1) providing a liquid crystal display device in which a liquid crystal material is separated from a photocurable resin more distinctly; (2) providing a liquid crystal display device in which no polymer remains in liquid crystal regions, thereby maintaining a good alignment state of the liquid crystal molecules; (3) providing a liquid crystal display device having excellent optical characteristics (e.g., response speed and contrast); (4) providing a liquid crystal display device having an excellent impact resistance; and (5) providing a method for producing such a liquid crystal display device.

These and other advantages of the present invention will become apparent to those skilled in the art upon reading and understanding the following detailed description with reference to the accompanying figures.

DESCRIPTION OF THE PREFERRED EMBODIMENTS

In the present specification, the phrase "transition temperature" refers to the transition temperature of liquid crystal (a liquid crystal material before phase separation and liquid crystal after phase separation). Namely, the "transition temperature" implies a temperature at which the liquid crystal changes from a liquid crystal state to an isotropic liquid state.

Figure 1:
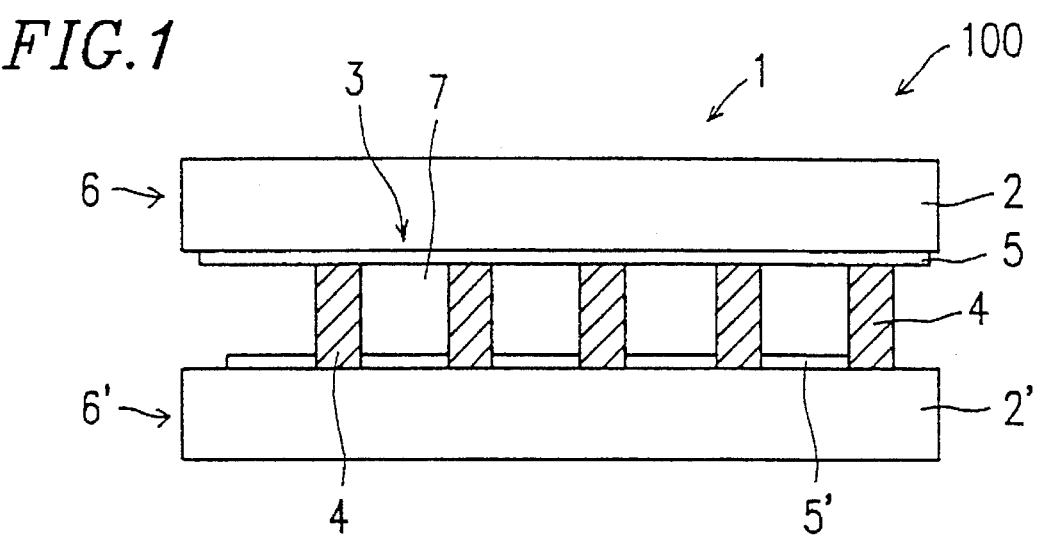
FIG. 1 is a schematic cross sectional view showing one example of a liquid crystal display device according to the present invention.

FIG. 1 is a schematic cross sectional view showing an example of a liquid crystal display device according to the present invention. This liquid crystal display device 100 includes a liquid crystal cell 1 and polarizing plates (not shown) provided on an outer surface of the liquid crystal cell. The liquid crystal cell 1 includes a pair of substrates 2 and 2' opposed to each other, and pixel electrodes 5 and 5', which are patterned in a predetermined pattern, and formed on the substrates 2 and 2', respectively. A liquid crystal region 7 and a polymeric wall 4 surrounding the liquid crystal region 7 are interposed between the substrates 2 and 2'. The liquid crystal region 7 and the polymeric wall 4 are formed by phase separation of a liquid crystal material from a photocurable resin. The polymeric wall 4 can be formed in a desired location.

It is sufficient that at least one of the substrates 2 and 2' is transparent. As the substrates 2 and 2', low alkali glass, quarts glass, silicon and a PET film are usable. One of the substrates may contain metal. The thickness of each substrate is preferably 0.1 to 1.2 mm.

As the pixel electrodes 5 and 5', ITO and aluminum can be used. The pixel electrodes 5 and 5' are deposited on the substrates 2 and 2' to a desired thickness, and then patterned to a desired pattern by photolithography, screen printing, or the like. A preferred patterning method is photolithography.

For example, the pixel electrodes 5 and 5' are formed as follows: The pixel electrodes 5 and 5' having a predetermined width are formed with a predetermined gap by photolithography. The pixel electrodes 5 and 5' are formed so as to be perpendicular to each other when being viewed from the normal direction with respect to the substrates 2 and 2'. Areas in which the electrodes 5 and 5' overlap are pixels (i.e., pixel areas 3) which contribute to display. The width of each pixel electrode is preferably 200 to 300 μm, the gap between the pixel electrodes is preferably 10 to 30 μm, and the thickness of each pixel electrode is preferably 0.1 to 0.25 μm. These may be varied depending on the use for the display.

Although not shown in FIG. 1, it is preferred to form an electric insulating film and an alignment film in this order in a predetermined location on the substrates 2 and 2'. As the electric insulating film, $SiO_2$ or the like can be used. The electric insulating film may be formed by sputtering or the like. As the alignment film, a polyimide resin or the like is usable. The alignment film may be formed by flexography or the like. The thickness of the alignment film is preferably 0.07 to 0.09 μm. Preferably, the alignment film may be subjected to an alignment process such as a rubbing method.

As for a liquid crystal material forming the liquid crystal region 7, any known organic mixture can be used, as far as the mixture exhibits liquid crystal behavior at room temperature and the vicinity thereof. Liquid crystal materials such as nematic, cholesteric, smectic, ferroelectric and discotic liquid crystal materials are usable. These types of liquid crystal materials may be used singularly or in combination of two or more.

A photocurable resin forming the polymeric wall 4 can be obtained by polymerizing photocurable monomers by a known technique. Examples of the photopolymerizable monomers are acrylic acid, methacrylic acid, ester thereof, each of which contains an alkyl group, an aryl group and a cycloalkyl group including three or more carbon atoms, and halides thereof. Specific examples thereof include isobutyl acrylate, stearyl acrylate, lauryl acrylate, isoamyl acrylate, 2-ethylhexyl acrylate, n-butyl methacrylate, n-lauryl methacrylate, tridecyl methacrylate, n-stearyl methacrylate, n-cyclohexyl methacrylate, benzyl methacrylate, isobornyl methacrylate, 2-phenoxyethyl methacrylate, adamantyl acrylate, 2,2,3,4,4,4,-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perfluorooctylethyl acrylate, and perchlorooctylethyl methacrylate. In addition, polyfounctional compounds can be used. Examples of polyfounctional compounds include bisphenol A diacrylate, bisphenol A dimethacrylate, 1,4-butanediol dimethacrylate, 1,6-hexanediol dimethacrylate, trimethylol propane triacrylate, and tetramethylol methane tetraacrylate. Such compounds may be used singularly, or in a combination of two or more so as to be polymerized.

An additive agent, such as a photopolymerization initiator or a chiral dopant, can be added to a mixture of the liquid crystal material and the photocurable resin, if necessary.

A mixture of the liquid crystal material, the photocurable resin and the additive agent (added when necessary) can be injected between the substrates by a known technique.

Hereinafter, a method for forming liquid crystal regions and polymeric walls by causing phase separation of the liquid crystal material from the photocurable resin will be described.

A liquid crystal cell containing the mixture is heated to a temperature higher than the transition temperature of the liquid crystal material (hereinafter, referred to as a "heating temperature"), and the liquid crystal cell is then cooled to a temperature lower than the transition temperature of the liquid crystal material (hereinafter, referred to as a "cooling temperature"). Although the heating temperature is varied depending on the transition temperature, the heating temperature is preferably 80° to 110° C., and more preferably, 90° to 100° C. The cooling temperature is preferably room temperature or lower, and more preferably, 0° C. or lower. In the case where the cooling temperature is 0° C. or lower, the photocurable resin is crystallized. As a result, the photocurable resin which remains in the liquid crystal material can be easily separated, thus enhancing purity of the liquid crystal in the liquid crystal regions. A cooling rate is preferably 3° C./h to 20° C./h, and more preferably, 5° C./h to 10° C./h. Gradual cooling in such a range enables the liquid crystal material and the photocurable resin to take sufficient time to move. As a result, it is possible to increase the respective mobility of the liquid crystal material and the photocurable resin. Accordingly, the phase separation between the liquid crystal material and the photocurable resin occurs more easily, and more distinct liquid crystal regions and polymeric regions can be formed.

Preferably, the heating and cooling process is repeated several times. Although the number of repetitions of the heating and cooling process depends on the compatibility between the liquid crystal material and the photocurable resin (i.e., how easily the phase separation can be caused), the number is preferably 1 to 7 times, and more preferably, 3 to 5 times.

Preferably, UV rays can be selectively radiated on a desired location of the liquid crystal cell at the heating temperature. By radiating the UV rays at such a high temperature, the photocurable resin left in the liquid crystal material is prompted to be separated from the liquid crystal material, so that the purity of the liquid crystal in the liquid crystal regions formed in the pixel areas can be enhanced. More specifically, the liquid crystal material goes into an isotropic liquid state by being heated to a heating temperature higher than the transition temperature. Thus, the compatibility of the liquid crystal material and the photocurable resin is enhanced. As a result, the homogeneity of the mixture of the liquid crystal and the photocurable resin is improved, and the mobility of the molecules of the liquid crystal material and the photocurable resin is raised. Therefore, it is possible to cause phase separation of the liquid crystal material from the photocurable resin more easily in the cooling process, and to form more distinct liquid crystal regions and polymeric regions.

Although the UV ray radiation can be conducted in any one of the repetitive heating processes, it is preferred to conduct the UV ray radiation after the heating and cooling process is performed at least once. The reason for this is that the volume of the photocurable resin contained in the mixture of the liquid crystal material and the photocurable resin is varied by a temperature change due to the heating and cooling process. Random phase separation of the liquid crystal material from the photocurable resin is initially caused due to the discharge effect caused by the variation in the volume. Therefore, by causing the random phase separation of the liquid crystal material from the photocurable resin before the UV ray radiation, the phase separation of the liquid crystal from the photocurable resin by the UV ray radiation can be conducted more easily, and more distinct liquid crystal regions and polymeric regions can be formed.

Examples of the source of UV rays include a high pressure mercury lamp and a metal halide lamp. Examples of methods for radiating the UV rays selectively include a method using a photomask, a self-alignment method in which pixel electrodes (ITO electrodes) are used as photomasks. The UV rays may be radiated to one face of the liquid crystal cell, or both faces thereof. In the case where a photomask is used, however, it is preferred to radiate the UV rays over the face of the liquid crystal cell on the side of the photomask. The illuminance is preferably 5 to 12 mW/cm$^2$, and more preferably, 6 to 8 mW/cm$^2$. The period of radiation is preferably 5 to 10 minutes, and more preferably, 6 to 8 minutes.

One example showing an effect of such a heating and cooling process and UV ray radiation will be described with reference to FIGS. 2A, 2B and 2C.

Figure 2A:
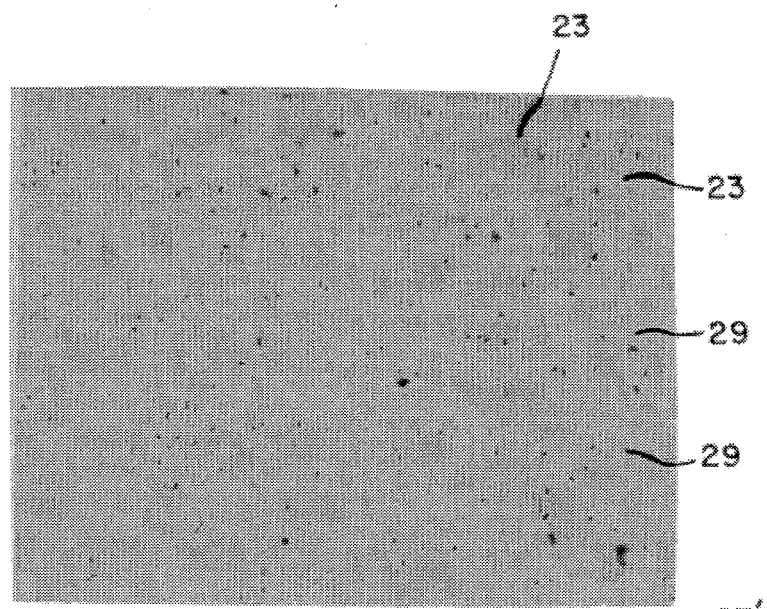
FIG. 2A is a photograph showing a liquid crystal cell before a heating and cooling procedure in a method for producing a liquid crystal display device according to the present invention.
Figure 2B:
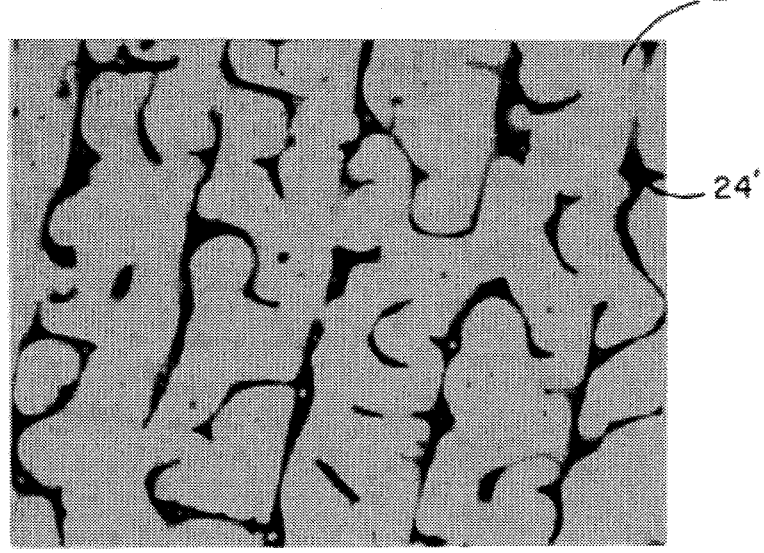
FIG. 2B is a photograph showing the liquid crystal cell after the heating and cooling procedure in a method for producing a liquid crystal display device according to the present invention.
Figure 2C:
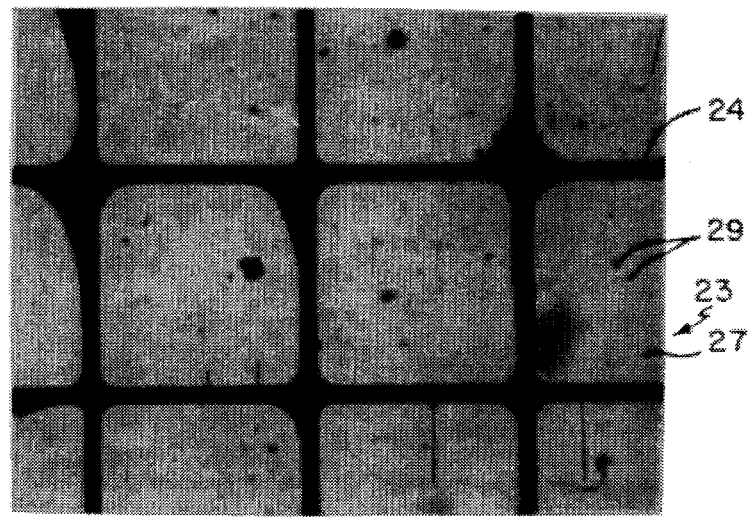
FIG. 2C is a photograph showing the liquid crystal cell after being irradiated with UV rays selectively in a desired location of the liquid crystal cell at the heating temperature in a method for producing a liquid crystal display device according to the present invention.

FIG. 2A is a schematic view showing a liquid crystal cell before a heating and cooling process. In FIG. 2A, reference numeral 23 denotes a pixel area and black spots 29 are spacers. As shown in FIG. 2A, a uniform mixture of a liquid crystal material and a photocurable resin is injected before the heating and cooling process. FIG. 2B is a schematic view showing the liquid crystal cell after the heating and cooling process is conducted. In FIG. 2B, reference numeral 27' denotes the liquid crystal material obtained by random phase separation, and a black band portion 24' is the photocurable resin obtained by random phase separation. As shown in FIG. 2B, the liquid crystal material and the photocurable resin are phase-separated at random by being subjected to the heating and cooling process. FIG. 2C is a schematic view showing the liquid crystal cell after desired locations (i.e., non-pixel areas) of the liquid crystal cell are selectively irradiated with UV rays at the heating temperature. As shown in FIG. 2C, by the selective radiation of UV rays, polymeric walls 24 are formed so as to surround liquid crystal regions 27 formed in the pixel areas 23.

An amount of the polymer existing in the liquid crystal region formed as described above is preferably 3 weight % or smaller, and more preferably, 2 weight % or smaller based on the total amount of the liquid crystal and polymer existing in the liquid crystal region. The difference between the transition temperature of the liquid crystal in the liquid crystal region and the transition temperature of the liquid crystal material before being mixed with the photocurable resin is preferably ±10° C. or less, and more preferably, ±5° C. or less.

A liquid crystal display device according to the present invention and a production method thereof are applicable to liquid crystal of most modes (TN, STN, FLC, ECB etc.), which can be actively driven. Further, a method for producing a liquid crystal display device according to the present invention is applicable to a transmissive type liquid crystal display device and a reflective type liquid crystal display device.

The above-mentioned preferred embodiments can be combined in any appropriate way.

According to the present invention, a liquid crystal cell where a mixture of a liquid crystal material and a photocurable resin is interposed between substrates is heated to a heating temperature higher than the transition temperature of the liquid crystal material, and then cooled to a cooling temperature lower than the transition temperature of the liquid crystal material. The liquid crystal material in the mixture in the liquid crystal cell goes into an isotropic liquid state by heating the liquid crystal cell to such a high heating temperature. For this reason, the compatibility of the liquid crystal material and the photocurable resin is enhanced. As a result, the homogeneity of the mixture of the liquid crystal material and the photocurable resin is enhanced, and the mobility of the molecules of the liquid crystal material and the photocurable resin is raised. By controlling the mobility of the molecules of the liquid crystal material and the photocurable resin in this manner, it is possible to cause phase separation of the liquid crystal material from the photocurable resin more easily in a cooling process. As a result, it is possible to form more distinct liquid crystal regions and polymeric regions.

The effect of such a heating and cooling process becomes more conspicuous when the heating and cooling process is repeated several times. The reason for this is that a temperature variation due to the heating and cooling process causes a change in volume of the photocurable resin in the mixture. Random phase separation of the liquid crystal material from the photocurable resin is caused by the discharge effect due to the volume change. Therefore, by causing the random phase separation of the liquid crystal material from the photocurable resin before UV ray radiation, the phase separation of the liquid crystal material from the photocurable resin can be easily performed by the UV ray radiation, and more distinct liquid crystal regions and polymeric regions can be obtained.

Furthermore, according to a preferred embodiment of the present invention, UV rays are radiated to a liquid crystal cell at a heating temperature. In this case, a liquid crystal material and a photocurable resin are uniformly mixed, and the mobility of the molecules of the liquid crystal material and the photocurable resin is sufficiently great that when UV rays are radiated to the mixture, more definite phase separation can be attained.

Furthermore, by setting a cooling temperature at such a low level so as to crystallize a photocurable resin, the discharge effect becomes more conspicuous. Furthermore, by setting a cooling rate to be in an appropriate range, sufficient time required for a liquid crystal material and a photocurable resin to move can be reserved. As a result, the respective mobility of the liquid crystal material and the photocurable resin can be raised. Therefore, phase separation of the liquid crystal material and the photocurable resin can be performed more easily, and more distinct liquid crystal regions and polymeric regions can be obtained.

Such mechanisms are combined so as to perform phase separation of a liquid crystal material from a photocurable resin more easily, and to form more distinct liquid crystal regions and polymeric regions, thus obtaining a liquid crystal display device which is excellent in quality.

EXAMPLES

Hereinafter, the present invention will be described by way of specific examples, but the present invention is not limited to these examples.

Example 1

A liquid crystal display device 100, as is shown in FIG. 1, is manufactured as follows:

First, pixel electrodes 5 and 5' are formed of ITO in a striped shape with a width of 280 µm and a gap of 20 µm on a substrate 2 and 2' by photolithography. The pixel electrodes 5 and 5' have a thickness of 2000 Å. An electric insulating film and an alignment film are formed so as to cover the pixel electrodes 5 and 5', respectively. Next, the alignment film is subjected to a rubbing treatment with a nylon fabric. A substrate part 6 includes the pixel electrodes 5, the substrate 2, the insulating film and the alignment film. A substrate part 6' includes the pixel electrodes 5', the substrate 2', the insulating film and the alignment film. The pair of substrate parts 6 and 6' are opposed to each other so that the pixel electrodes 5 of the substrate part 6 are perpendicular to the pixel electrodes 5' of the substrate part 6', when being viewed from the normal direction with respect to the substrates. Then, the substrates parts 6 and 6' are attached to each other by a sealing agent with spacers (not shown) interposed therebetween.

Next, a mixture of a liquid crystal material, a photocurable resin and a photopolymerization initiator is injected into a gap between the substrates 6 and 6'. More specifically, 4 g of a liquid crystal material (ZLI-4792 manufactured by Merck & Co., Inc.) to which 0.3% of a chiral dopant (S-811) is added, a mixture of 0.1 g of adamanthyl acrylate, 0.07 g of p-phenylstyrene, 0.8 g of isobornyl methacrylate and 0.1 g of perfluoromethacrylate as a photocurable resin, and 0.003 g of a photopolymerization initiator (Irugacure 651 manufactured by Ciba-Geigy Corporation) are mixed. This mixture is injected by a vacuum injection method at a temperature atmosphere of about 30° C. Furthermore, an injection opening is sealed with commercially available UV curable resin while preventing UV rays from being radiated to the display area to obtain a liquid crystal cell 1.

Next, the liquid crystal cell 1 obtained in this manner is heated to a temperature of 95° C., and then cooled to room temperature at a cooling rate of 6° C./h. This heating and cooling treatment is repeated 5 times. Thus, liquid crystal regions 7 are formed in the pixel areas 3, and polymeric walls 4 are formed in the non-pixel areas.

A polarizing plate is attached to each of the faces of the liquid crystal cell 1 produced as described above to obtain a TN type liquid crystal display device 100.

When the liquid crystal display device 100 produced as described above is observed through a microscope, it is found that the liquid crystal regions 7 are concentrated in the pixel areas 3, and the polymer is not left at interfaces between the liquid crystal regions 7 and the alignment film, resulting in a good alignment state of the liquid crystal molecules. The polymeric walls 4 do not contain any liquid crystal molecules. In addition, no polymer components are contained in the liquid crystal regions 7 and the polymeric walls 4 are formed so as to surround the pixel areas 3.

The transition temperature of the liquid crystal in the liquid crystal regions 7 is 83° C., and the difference between the transition temperature of the liquid crystal in the liquid crystal region and that of the liquid crystal material before being mixed is 8° C. This indicates that the liquid crystal regions 7 are substantially occupied by liquid crystal. Table 1 shows the transition temperature $T_{N-1}$ of the liquid crystal of the liquid crystal regions 7, the transition temperature T of the liquid crystal material before being mixed and the difference between $T_{N-1}$ and T, together with the results of Examples 2 through 5 described below.

TABLE 1

|  | Example 1 | Example 2 | Example 3 | Example 4 | Example 5 |
| --- | --- | --- | --- | --- | --- |
| $T_{N-1}$ | 83° C. | 87° C. | 86° C. | 83° C. | 81° C. |
| T | 91° C. | 91° C. | 91° C. | 91° C. | 91° C. |
| Difference between $T_{N-1}$ and T | 8° C. | 4° C. | 5° C. | 8° C. | 10° C. |

Notes:
$T_{N-1}$: Transition temperature of liquid crystal in liquid crystal region
T: Transition temperature of liquid crystal material When the liquid crystal of the liquid crystal regions 7 is measured by gas chromatography, it is found that a content of the acrylic resin (i.e., a content of the polymer) is about 2.7 wt %.

Example 2

Figure 3:
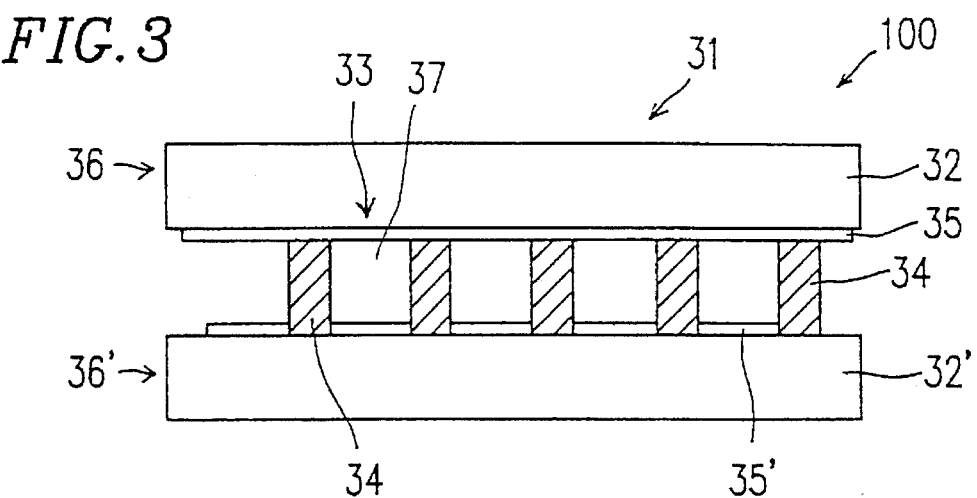
FIG. 3 is a schematic cross sectional view showing another example of a liquid crystal display device according to the present invention.

A liquid crystal cell 31 as is shown in FIG. 3 is produced in the same manner as in Example 1.

Figure 4A:
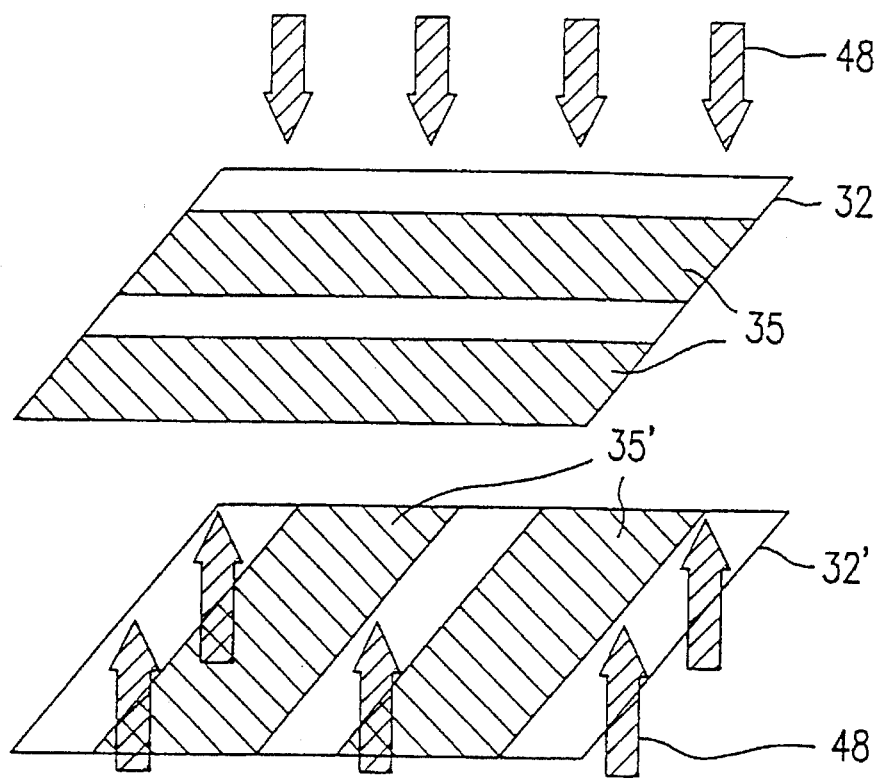
FIG. 4A is a schematic view showing a light radiation process for producing the liquid crystal display device shown in FIG. 3.
Figure 4B:
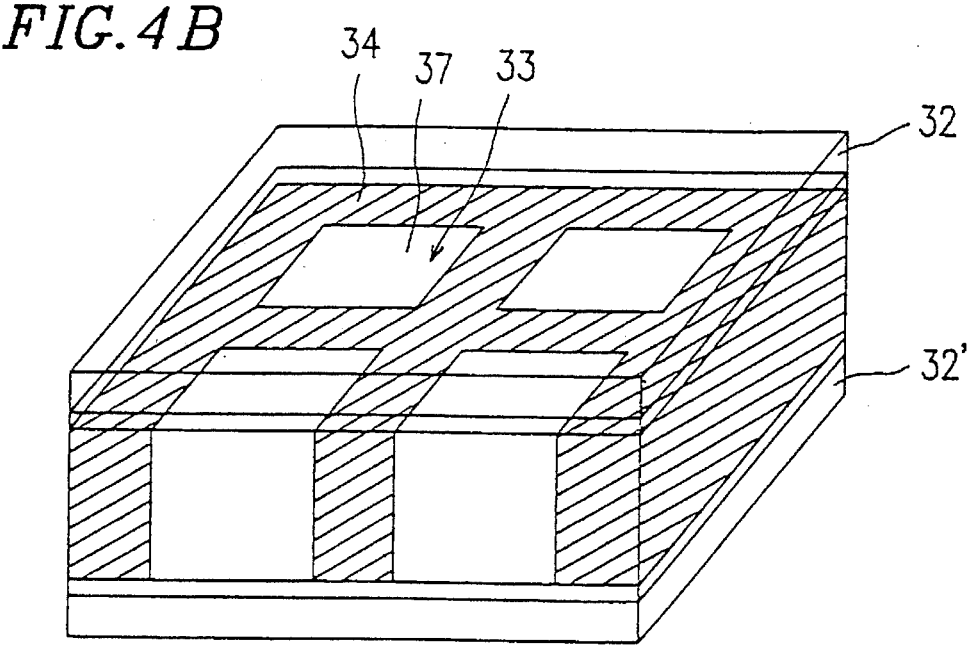
FIG. 4B is a schematic view showing a state after phase separation is caused in a process for producing the liquid crystal display device shown in FIG. 3.

Next, the liquid crystal cell 31 obtained in this manner is heated to a temperature of 95° C., and then cooled to room temperature at a cooling rate of 6° C./h. On this stage, the liquid crystal material and the photocurable resin have been phase-separated at random. Next, the liquid crystal cell 31 is again heated to a temperature of 95° C. Then, as shown in FIG. 4A and 4B, UV rays 48 are radiated using a self-alignment method in which the pixel electrodes 35 and 35' work as photomasks, so as to cause phase separation into a desired pattern. In the liquid crystal cell 31, the light transmittance of the pixel areas 33 in the range of wavelength from 250 nm to 400 nm is 40% of the light transmittance of the non-pixel areas. The UV ray radiation by the self-alignment method is performed under the following conditions: a source of light is a high pressure mercury lamp (wavelength: 365 nm); illuminance is 10 mW/cm$^2$; radiation time is 5 minutes; and both faces of the liquid crystal cell are irradiated. After the irradiation, the liquid crystal cell 31 is cooled to room temperature at a cooling rate of 7.2° C./h. In this manner, liquid crystal regions 37 are formed in the pixel areas 33, and polymeric walls 34 are formed in the non-pixel areas so as to surround the pixel areas 33. Furthermore, in order to cure the polymer sufficiently, the liquid crystal cell 31 is irradiated with weak UV rays.

A polarizing plate is attached to each of the faces of the liquid crystal cell 31 produced in this manner, thus obtaining a TN type liquid crystal display device 100.

When the liquid crystal display device 100 produced as described above is observed through a microscope, it is discovered that the liquid crystal regions 37 are concentrated in the pixel areas 33, and no polymer is left at interfaces between the liquid crystal regions 37 and the alignment film, resulting in a good alignment state of the liquid crystal molecules. The polymeric walls 34 do not contain any liquid crystal molecules. In addition, no polymer components are contained in the liquid crystal regions 37 and the polymeric walls 34 are formed so as to surround the pixel areas 33.

As shown in Table 1, the transition temperature of the liquid crystal in the liquid crystal regions 37 is 87° C., and the difference between the transition temperature of the liquid crystal in the liquid crystal regions 37 and that of the liquid crystal material before being mixed is 4° C. This indicates that the liquid crystal regions 37 are substantially occupied by liquid crystal.

When the liquid crystal of the liquid crystal regions 37 is measured by gas chromatography, it is found that a content of the acrylic resin (i.e., a content of the polymer) is about 2.4 wt %.

Example 3

Figure 5:
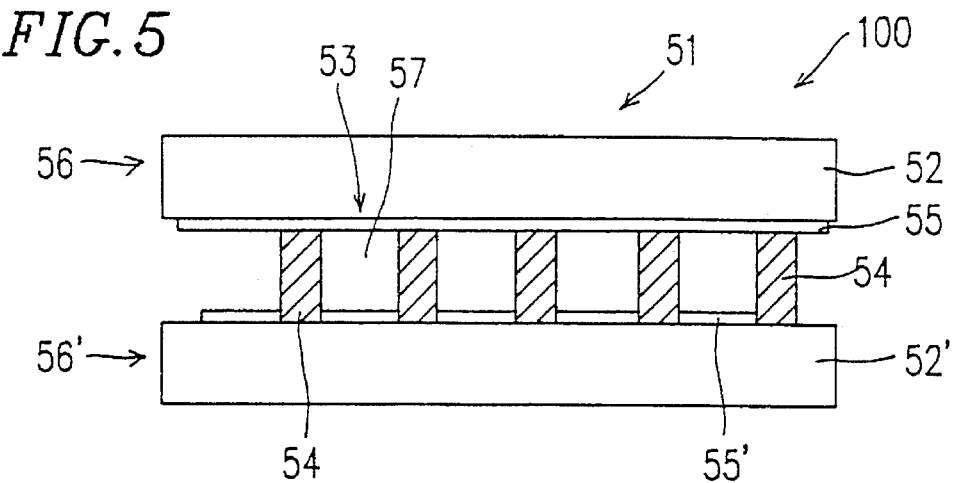
FIG. 5 is a schematic cross sectional view of still another example of a liquid crystal display device according to the present invention.

A liquid crystal cell 51 as is shown in FIG. 5 is produced in the same manner as in Example 1.

Next, the liquid crystal cell 51 obtained in this manner is heated to a temperature of 95° C. While maintaining the temperature at 95° C., the liquid crystal cell 51 is irradiated with UV rays, using a self-alignment method in the same manner as in Example 2, so as to cause phase separation into a desired pattern. The UV ray radiation by the self-alignment method is performed under the following conditions: a source of light is a high pressure mercury lamp (wavelength: 365 nm); illuminance is 10 mW/cm$^2$; radiation time is 5 minutes; and both faces of the liquid crystal cell are irradiated. After the irradiation, the liquid crystal cell 51 is cooled to room temperature at a cooling rate of 6° C./h. Furthermore, the liquid crystal cell is again heated to a temperature of 95° C., and again irradiated with UV rays by the self-alignment method with this temperature maintained. The UV ray radiation is performed under the following conditions: a source of light is a high pressure mercury lamp (wavelength: 365 nm); illuminance is 10 mW/cm$^2$; radiation time is 5 minutes; and both faces of the liquid crystal cell are irradiated. Finally, the liquid crystal cell 51 is cooled to room temperature at a cooling rate of 6° C./h.

A polarizing plate is attached to each of the faces of the liquid crystal cell 51 produced in this manner, thus obtaining a TN type liquid crystal display device 100.

When the liquid crystal display device 100 produced as described above is observed through a microscope, it is discovered that liquid crystal regions 57 are concentrated in pixel areas 53, and no polymer is left at interfaces between the liquid crystal regions 57 and the alignment film, resulting in a good alignment state of the liquid crystal molecules. Polymeric walls 54 do not contain any liquid crystal molecules. In addition, no polymer components are contained in the liquid crystal regions 57 and the polymeric walls 54 are formed so as to surround the pixel areas 53.

As shown in Table 1, the transition temperature of the liquid crystal in the liquid crystal regions 57 is 86° C., and the difference between the transition temperature of the liquid crystal in the liquid crystal regions 57 and that of the liquid crystal material before being mixed is 5° C. This indicates that the liquid crystal regions 57 are substantially occupied by liquid crystal.

When the liquid crystal of the liquid crystal regions 57 is measured by gas chromatography, it is found that a content of the acrylic resin (i.e., a content of the polymer) is about 2.7 wt %.

Example 4

Figure 6:
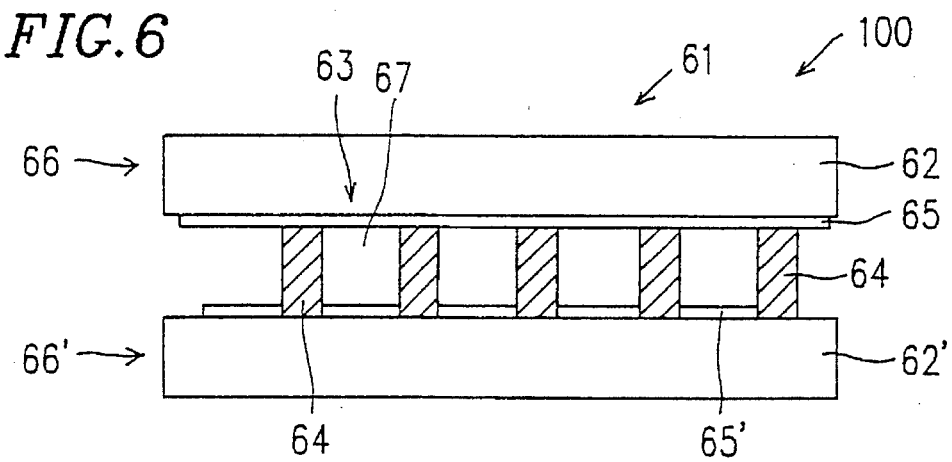
FIG. 6 is a schematic cross sectional view of still another example of a liquid crystal display device according to the present invention.

A liquid crystal cell 61 as is shown in FIG. 6 is produced in the same manner as in Example 1.

Next, the liquid crystal cell 61 obtained in this manner is heated to a temperature of 95° C. While maintaining the temperature at 95° C., the liquid crystal cell is irradiated with UV rays, using a self-alignment method in the same manner as in Example 2, so as to cause phase separation into a desired pattern. The UV ray radiation by the self-alignment method is performed under the following conditions: a source of light is a high pressure mercury lamp (wavelength: 365 nm); illuminance is 10 mW/cm$^2$; radiation time is 5 minutes; and both faces of the liquid crystal cell are irradiated. After the irradiation, the liquid crystal cell 61 is cooled to a temperature of 0° C. at a cooling rate of 6° C./h. Furthermore, the liquid crystal cell is again heated to a temperature of 95° C., and again irradiated with UV rays by the self-alignment method with this temperature maintained. The UV ray radiation is performed under the following conditions: a source of light is a high pressure mercury lamp (wavelength: 365 nm); illuminance is 10 mW/cm$^2$; radiation time is 5 minutes; and both faces of the liquid crystal cell are irradiated. Finally, the liquid crystal cell 61 is cooled to a temperature of 0° C. at a cooling rate of 3° C./h.

A polarizing plate is attached to each of the faces of the liquid crystal cell 61 produced in this manner, thus obtaining a TN type liquid crystal display device 100.

When the liquid crystal display device 100 produced as described above is observed through a microscope, it is discovered that liquid crystal regions 67 are concentrated in pixel areas 63, and no polymer is left on interfaces between the liquid crystal regions 67 and the alignment film, resulting in a good alignment state of the liquid crystal molecules. Polymeric walls 64 do not contain any liquid crystal molecules. In addition, no polymer components are contained in the liquid crystal regions 67 and the polymeric walls 64 are formed so as to surround the pixel areas 63.

As shown in Table 1, the transition temperature of the liquid crystal in the liquid crystal regions 67 is 83° C., and the difference between the transition temperature of the liquid crystal in the liquid crystal regions 67 and that of the liquid crystal material before being mixed is 8° C. This indicates that the liquid crystal regions 67 are substantially occupied by liquid crystal.

When the liquid crystal of the liquid crystal region 67 is measured by gas chromatography, it is found that a content of the acrylic resin (i.e., a content of the polymer) is about 2.8 wt %.

Example 5

Figure 7:
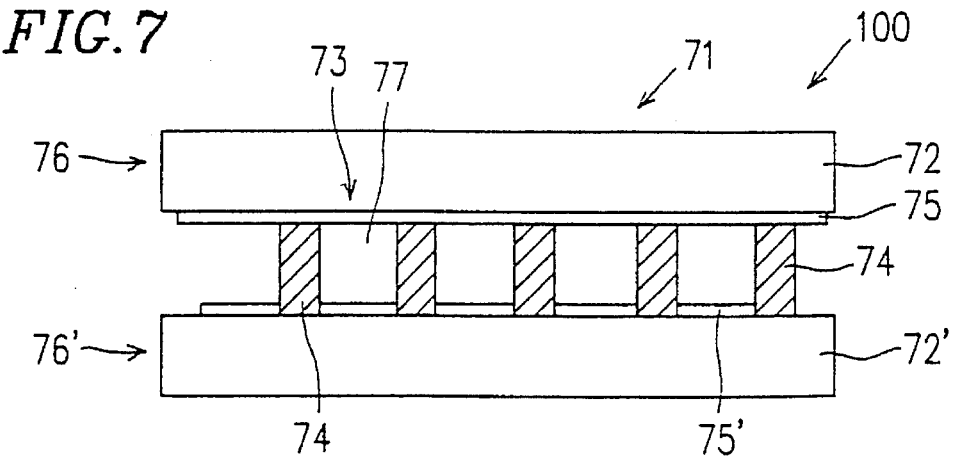
FIG. 7 is a schematic cross sectional view of still another example of a liquid crystal display device according to the present invention.

A liquid crystal cell 71 as is shown in FIG. 7 is produced in the same manner as in Example 2, except that a photomask is used. A specific example of UV ray radiation will be described below.

Figure 8A:
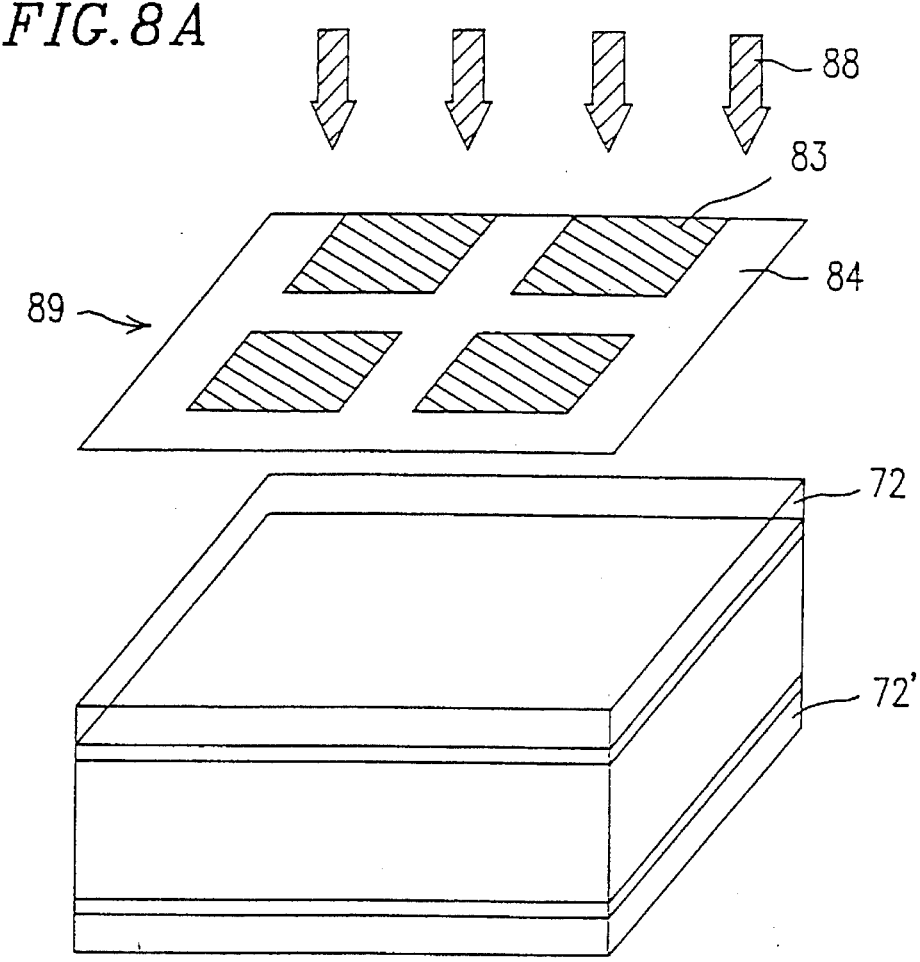
FIG. 8A is a schematic view showing a light radiation process for producing the liquid crystal display device shown in FIG. 7
Figure 8B:
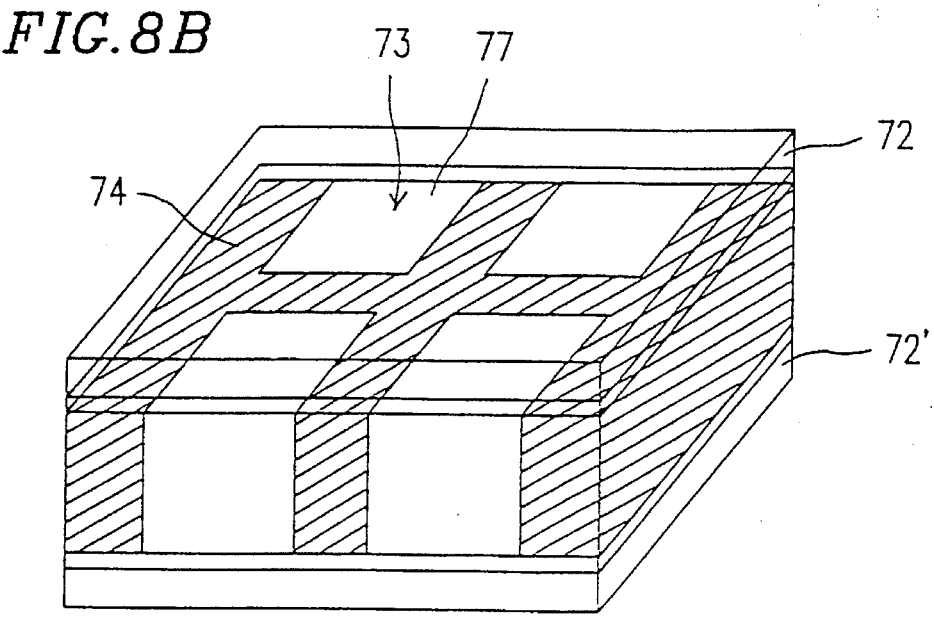
FIG. 8B is a schematic view showing a state after phase separation is caused in a process for producing the liquid crystal display device shown in FIG. 7.

As shown in FIG. 8A, a photomask 89 has a pattern of light-shielding portions 83 and transparent portions 84, which is matched with a desired pattern of pixel areas 73 and polymeric walls 74. The photomask 89 is provided on one substrate 72 of the liquid crystal cell 71, and fixed. The liquid crystal cell 71 to which the photomask 89 is fixed is heated to a temperature of 95° C., and then cooled to room temperature at a cooling rate of 6° C./h. At this stage, the liquid crystal material and the photocurable resin have been phase-separated at random. Next, the liquid crystal cell 71 is again heated to a temperature of 95° C., and irradiated with UV rays 88 via the photomask 89, as shown in FIGS. 8A and 8B. In this manner, phase separation into a desired pattern is performed. The UV ray radiation is performed under the following conditions: a source of light is a high pressure mercury lamp (wavelength: 365 nm); illuminance is 10 mW/cm$^2$; radiation time is 5 minutes; and the face of the substrate 72 having the photomask 89 is irradiated. In this manner, liquid crystal regions 77 are formed in the pixel areas 73, and the polymeric walls 74 are formed in the non-pixel areas so as to surround the pixel areas 73. After the irradiation, the liquid crystal cell 71 is cooled to room temperature at a cooling rate of 6° C./h. Next, the photomask 89 is removed from the substrate 72. The liquid crystal cell 71 is again heated to a temperature of 95° C., and again irradiated with UV rays while this temperature is maintained. The UV ray radiation is performed under the following conditions: a source of light is a high pressure mercury lamp (wavelength: 365 nm); illuminance is 10 mW/cm$^2$; radiation time is 5 minutes; and both faces of the liquid crystal cell are irradiated. Finally, the liquid crystal cell 71 is cooled to room temperature at a cooling rate of 6° C./h.

A polarizing plate is attached to each of the sides of the liquid crystal cell 71 produced in this manner, thus obtaining a TN type liquid crystal display device 100.

When the liquid crystal display device 100 produced as described above is observed through a microscope, it is discovered that liquid crystal regions 77 are concentrated in the pixel areas 73, and no polymer is left at interfaces between the liquid crystal regions 77 and the alignment film, resulting in a good alignment state of the liquid crystal molecules. The polymeric walls 74 do not contain any liquid crystal molecules. In addition, no polymer components are contained in the liquid crystal regions 77 and the polymeric walls 74 are formed so as to surround the pixel areas 73.

As is shown in Table 1, the transition temperature of the liquid crystal in the liquid crystal regions 77 is 81° C., and the difference between the transition temperature of the liquid crystal in the liquid crystal regions 77 and that of the liquid crystal material before being mixed is 10° C. This indicates that the liquid crystal regions 77 are substantially occupied by liquid crystal.

When the liquid crystal of the liquid crystal regions 77 is measured by gas chromatography, it is found that a content of the acrylic resin (i.e., a content of the polymer) is about 3.0 wt %.

As described above, the present invention provides a liquid crystal display device having the following advantages: (1) definite phase separation of a liquid crystal material from a photocurable resin is performed; (2) no polymer remains in liquid crystal regions, thereby maintaining a good alignment state of the liquid crystal; and (3) excellent optical characteristics (e.g., response speed and contrast) and impact resistance are provided. The present invention also provides a method for producing such a liquid crystal display device. Such a liquid crystal display device and a production method thereof are preferably applicable to liquid crystal of most modes (TN, STN, FLC, ECB, etc.), which can be actively driven.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal display device including a pair of substrates provided with electrodes, at least one of the substrates being transparent, a liquid crystal region, and a polymeric wall surrounding the liquid crystal region, the liquid crystal region and the polymeric wall being interposed between the pair of substrates, the liquid crystal display device being produced by a process comprising the steps of:

heating a liquid crystal cell including a mixture containing a liquid crystal material and a photocurable resin interposed between the pair of substrates to a temperature higher than a transition temperature of the liquid crystal material in order to control a mobility of the liquid crystal material and the photocurable resin, the step of heating being performed at least once; and cooling the heated liquid crystal cell to a temperature lower than the transition temperature in order to cause phase separation of the liquid crystal material from the photocurable resin and to form a liquid crystal region and a polymeric wall at desired locations, the step of cooling being performed at least once.

2. A liquid crystal display device according to claim 1, wherein an amount of a polymer existing in the liquid crystal region is equal to or smaller than about 3 weight % with respect to the total amount of liquid crystal and the polymer existing in the liquid crystal region.

3. A liquid crystal display device according to claim 1, wherein a difference between a transition temperature of liquid crystal existing in the liquid crystal region and a transition temperature of the liquid crystal material is equal to or smaller than about ±10° C.

4. A method for producing a liquid crystal display device including a pair of substrates provided with electrodes, at least one of the substrates being transparent, a liquid crystal region, and a polymeric wall surrounding the liquid crystal region, the liquid crystal region and the polymeric wall being interposed between the pair of substrates, the method comprising the steps of:

heating a liquid crystal cell including a mixture containing a liquid crystal material and a photocurable resin interposed between the pair of substrates to a temperature higher than a transition temperature of the liquid crystal material in order to control a mobility of the liquid crystal material and the photocurable resin, the step of heating being performed at least once; and cooling the heated liquid crystal cell to a temperature lower than the transition temperature in order to cause phase separation of the liquid crystal material from the photocurable resin and to form a liquid crystal region and a polymeric wall at desired locations, the step of cooling being performed at least once.

5. A method for producing a liquid crystal display device according to claim 4, further comprising the step of irradiating the liquid crystal cell with UV rays at least once at a temperature higher than the transition temperature.

6. A method for producing a liquid crystal display device according to claim 5, wherein the UV ray radiation is performed by using a self-alignment method.

7. A method for producing a liquid crystal display device according to claim 5, wherein the UV ray radiation is performed through a photomask.

8. A method for producing a liquid crystal display device according to claim 4, wherein the temperature lower than the transition temperature is equal to or lower than room temperature.

9. A method for producing a liquid crystal display device according to claim 8, wherein the temperature lower than the transition temperature is equal to or lower than about 0° C.

10. A method for producing a liquid crystal display device according to claim 4, wherein a cooling rate in the cooling step is in a range from about 3° C./h to about 20° C./h.

* * * * *